(12) United States Patent
Tran et al.

(10) Patent No.: US 10,219,977 B2
(45) Date of Patent: *Mar. 5, 2019

(54) FOOT SPA WITH UV LIGHTS

(71) Applicant: Gulfstream Inc., Cambridge (CA)

(72) Inventors: Minh Sang Tran, Ontario (CA); Chris Alexander, Ontario (CA)

(73) Assignee: Gulfstream Inc., Cambridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,094

(22) Filed: Sep. 13, 2016

(65) Prior Publication Data

US 2017/0071822 A1    Mar. 16, 2017

Related U.S. Application Data

(60) Provisional application No. 62/218,037, filed on Sep. 14, 2015, provisional application No. 62/219,169, filed on Sep. 16, 2015.

(51) Int. Cl.
| | | |
|---|---|---|
| *A61H 35/00* | (2006.01) | |
| *F04D 13/06* | (2006.01) | |
| *F04D 29/02* | (2006.01) | |
| *H02K 1/27* | (2006.01) | |
| *A61H 33/00* | (2006.01) | |

(52) U.S. Cl.
CPC ....... *A61H 35/006* (2013.01); *A61H 33/6021* (2013.01); *F04D 13/06* (2013.01); *F04D 29/026* (2013.01); *H02K 1/276* (2013.01); *A61H 33/0091* (2013.01); *A61H 2201/0188* (2013.01); *A61H 2201/1215* (2013.01); *A61H 2201/14* (2013.01)

(58) Field of Classification Search
CPC ...................................................... E03C 1/136
USPC ................ 4/654, 509, 574.1, 541; 210/629; 417/278; 601/16–17, 158, 22, 70; 362/89, 555; 607/86
See application file for complete search history.

(56) References Cited

U.S. PATENT DOCUMENTS

| | | | |
|---|---|---|---|
| 9,572,747 B2* | 2/2017 | Tran ......................... | H02K 7/11 |
| 2003/0076692 A1* | 4/2003 | Love ......................... | F21S 8/00 |
| | | | 362/555 |
| 2006/0036198 A1* | 2/2006 | Cafaro .................... | A61H 23/02 |
| | | | 601/16 |

(Continued)

*Primary Examiner* — Lori Baker

(74) *Attorney, Agent, or Firm* — Avery N. Goldstein; Blue Filament Law PLLC

(57) ABSTRACT

A spa is provided that includes: a basin; a motor having a shaft defining a rotation axis; a hub mounted to the shaft, the hub having North and South pole domains spaced apart from each other and arranged to encircle the rotation axis in alternating relation; and an impeller which is disposed in the basin in axially spaced relation to the hub and is at least substantially constrained against movement but for rotation about the axis, the impeller including a rotor body of a non-magnetic, electrically-conductive material having relatively low magnetic permeability. The improvement in which is that there are lights and coils coupled to the impeller for rotation therewith, the lights and coils being coupled and adapted such that, in use, the rotating magnetic fields associated with the drive hub created induced currents in the coils which actuate the lights and create a net force that rotates the impeller.

7 Claims, 8 Drawing Sheets

(56) References Cited

U.S. PATENT DOCUMENTS

| | | | |
|---|---|---|---|
| 2007/0245480 A1* | 10/2007 | Sorensen | A61H 33/0087 4/509 |
| 2012/0127695 A1* | 5/2012 | Tran | A01K 63/047 362/89 |
| 2013/0269098 A1* | 10/2013 | Tran | A61H 33/0091 4/541.1 |
| 2015/0101117 A1* | 4/2015 | Tran | H02K 7/11 4/541.3 |

* cited by examiner

FOOT SPA WITH UV LIGHTS

RELATED APPLICATIONS

This application is a non-provisional application that claims priority benefit of U.S. Provisional Application Ser. No. 62/218,037 filed Sep. 14, 2015 and U.S. Provisional Application Ser. No. 62/219,169 filed Sep. 16, 2015; the contents of which are hereby incorporated by reference.

FIELD OF THE INVENTION

The invention relates to the field of foot spas.

BACKGROUND OF THE INVENTION

It is known to produce a foot spa which includes a basin for holding water and an impeller which is disposed interiorly of the basin and rotated by magnetic fields originating exteriorly of the basin.

SUMMARY OF THE INVENTION

Forming one aspect of the invention is an improved spa.

The spa is of the type includes: a basin for containing water; a motor mounted exteriorly of the basin and having a rotating shaft, the shaft defining a rotation axis orientated towards the interior of the basin; a drive hub mounted to the shaft for rotation therewith, the hub having two or more North pole domains and two or more South pole domains, the North and South pole domains being spaced apart from each other and arranged to encircle the rotation axis in alternating relation; and an impeller which is disposed in the basin in axially spaced relation to the drive hub and is at least substantially constrained against movement but for rotation about the rotation axis, the impeller including a rotor body of a non-magnetic, electrically-conductive material having relatively low magnetic permeability.

The improvement includes: one or more lights coupled to the impeller for rotation therewith; and one or more coils coupled to the impeller for rotation therewith and coupled to the lights, the lights and coils being adapted such that, in use, the rotating magnetic fields associated with the drive hub created induced currents in the coils which actuate the lights and create a net force that rotates the impeller.

According to another aspect of the invention, each of the North pole domains can be defined by a respective permanent magnet and each of the South pole domains is defined by a respective permanent magnet.

According to another aspect of the invention, the number of North pole domains can equal the number of South pole domains.

According to another aspect of the invention, the permanent magnets can be equally spaced about the rotation axis.

According to another aspect of the invention, the rotor body can be made of a paramagnetic material.

According to another aspect of the invention, rotor body can be made of an aluminum alloy.

According to another aspect of the invention, the permanent magnets can be disc-shaped.

According to another aspect of the invention, the lights can be UV lights.

Other advantages, features and characteristics of the invention will become apparent upon review of the detailed description and the appended drawings, the latter being briefly described hereinafter.

DETAILED DESCRIPTION

Figure 1:
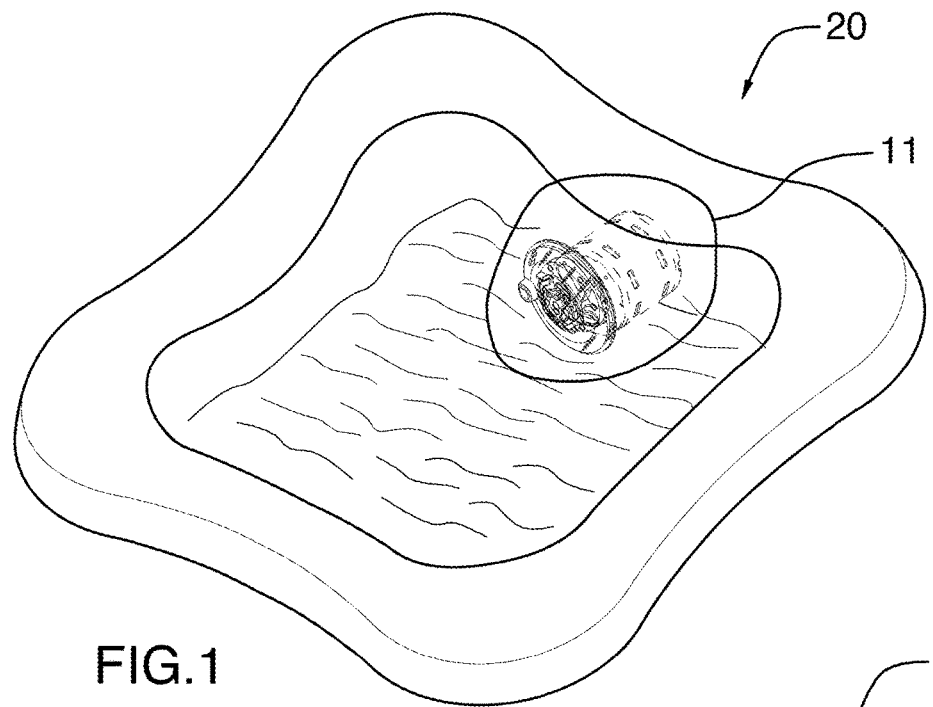
FIG. 1 is a perspective view of an exemplary embodiment of the invention, in use.
Figure 2:
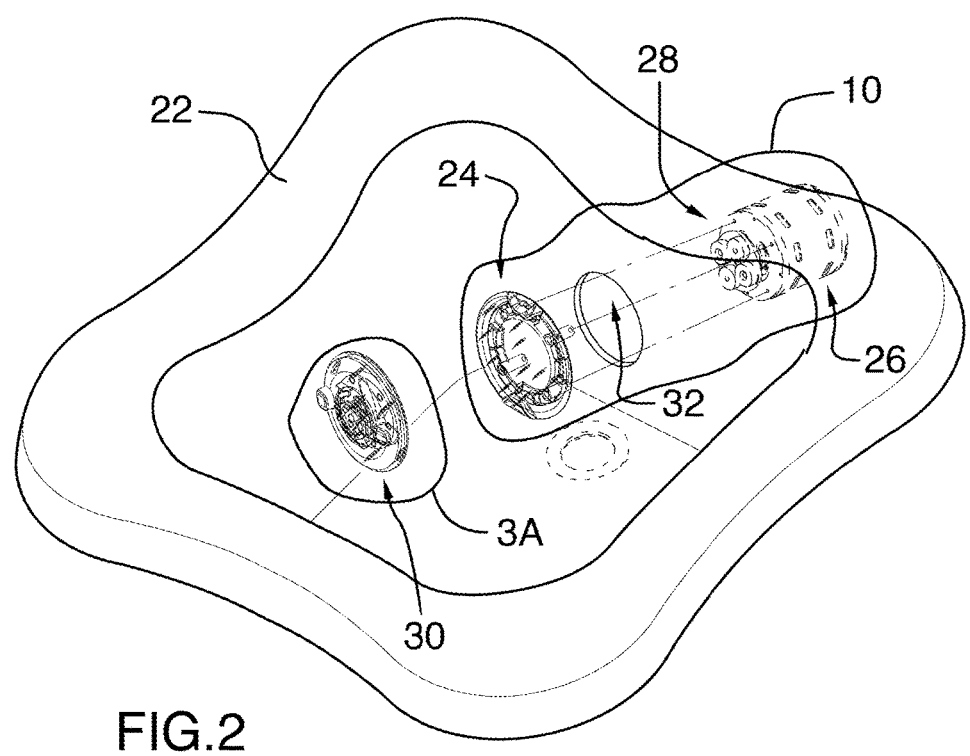
FIG. 2 is an exploded view of the structure of FIG. 1.

Reference is now made to FIG. 2 which shows an exploded view of an exemplary embodiment 20 of the invention.

The exemplary embodiment 20 will be understood to be a foot spa of the type which includes
 a basin 22
 a mount 24
 a motor 26
 a drive hub 28
 a pump 30

Figure 11:
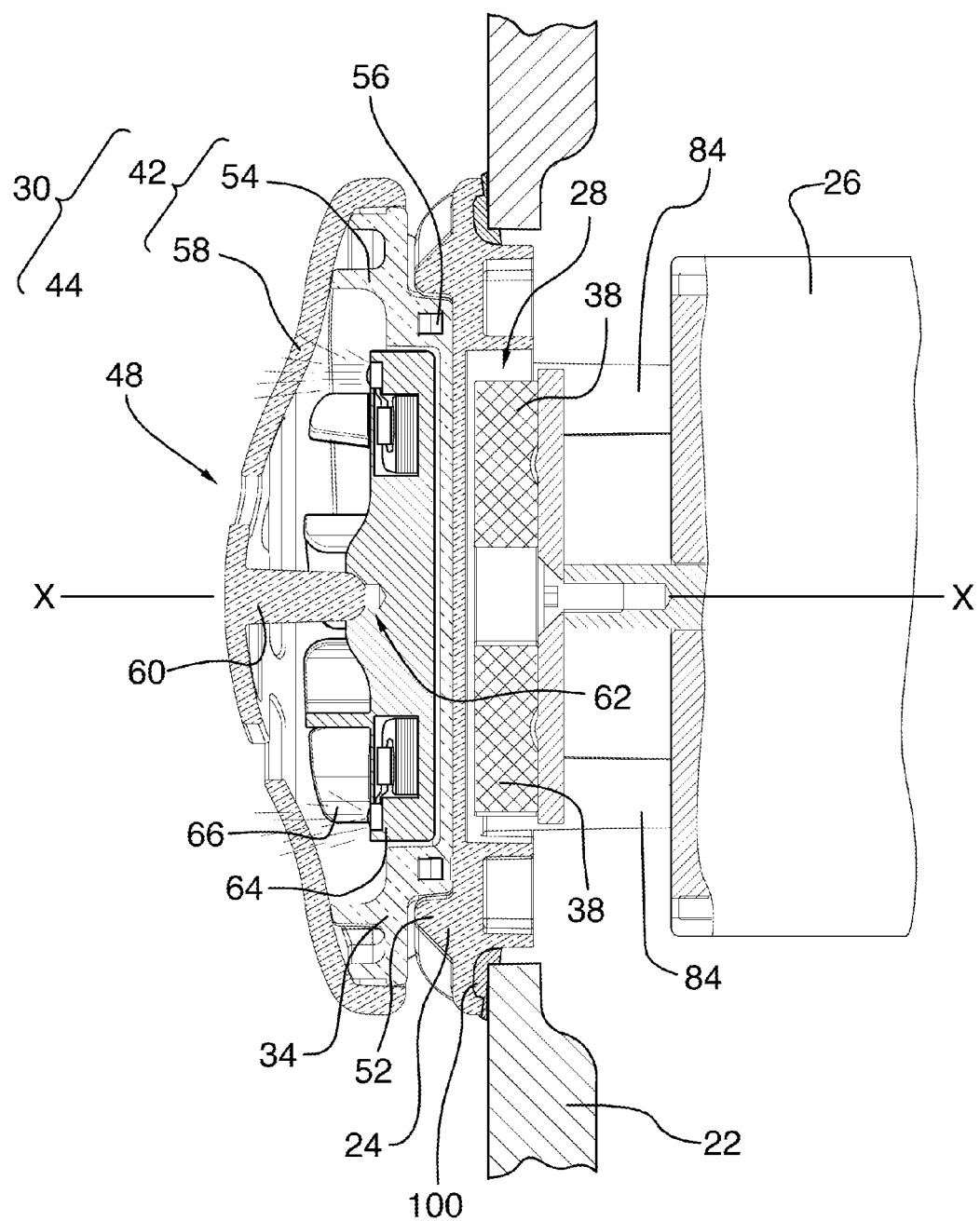
FIG. 11 is a side cross-sectional view of the structure of encircled area 11 of FIG. 1.

The basin 22 which can, for example, be manufactured from fiberglass, will be seen to have a side aperture 32 and will be understood to be adapted to contain water when the side aperture 32 is sealed, for example with a gasket 100 as shown in FIG. 11 or another suitable sealant.

Figure 10:
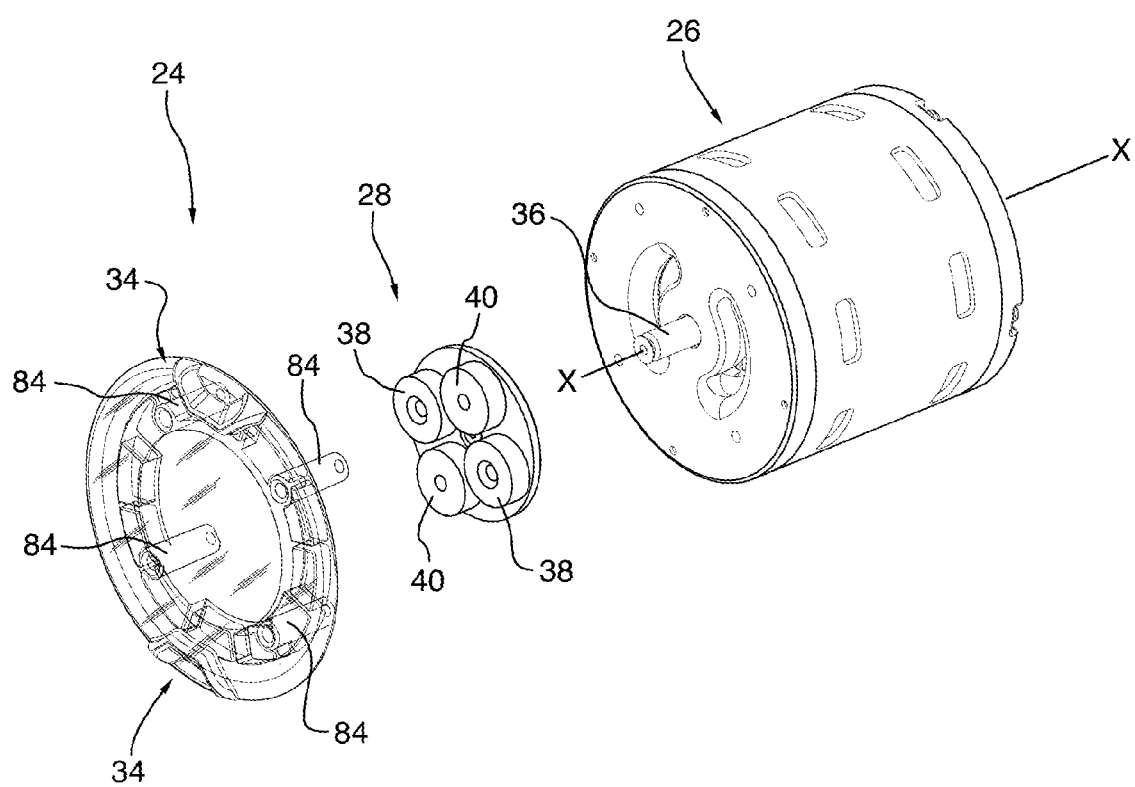
FIG. 10 is an exploded view of the structure of encircled area 10 of FIG. 3.

The mount 24 defines a pair of recesses 34, best seen in FIG. 10.

The motor 26 has a rotating shaft 36 which defines a rotation axis X-X.

Figure 3A:
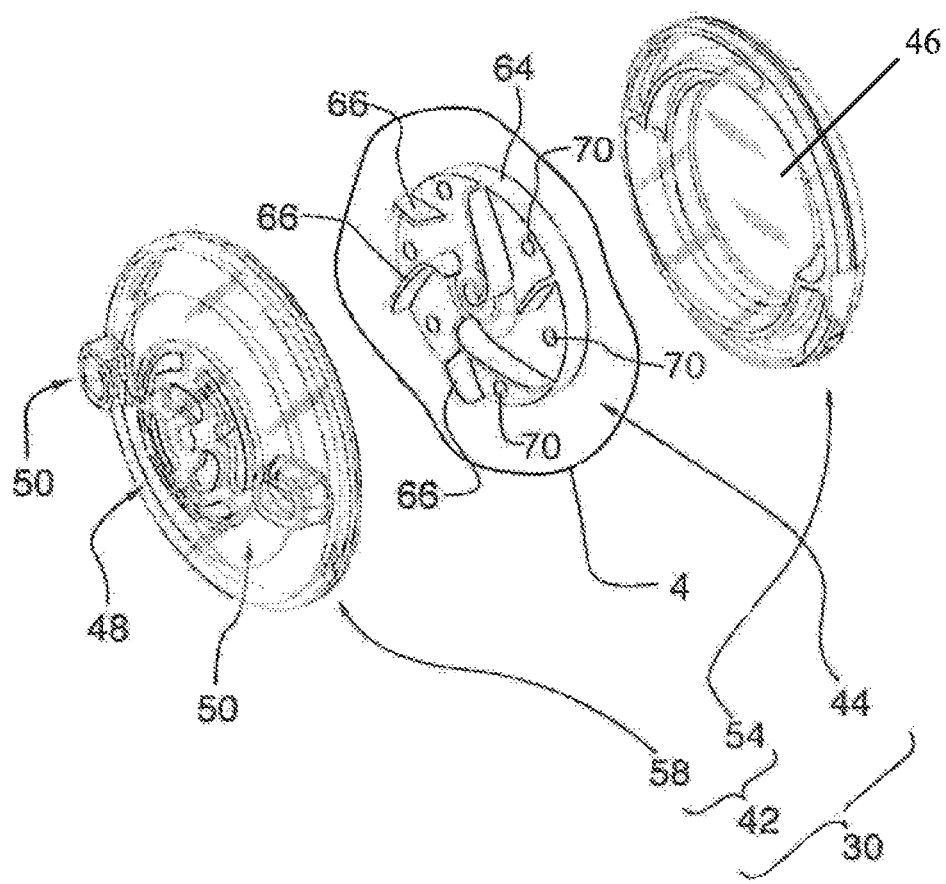
FIG. 3A is an exploded view of the structure of encircled area 3A of FIG. 2.
Figure 3B:
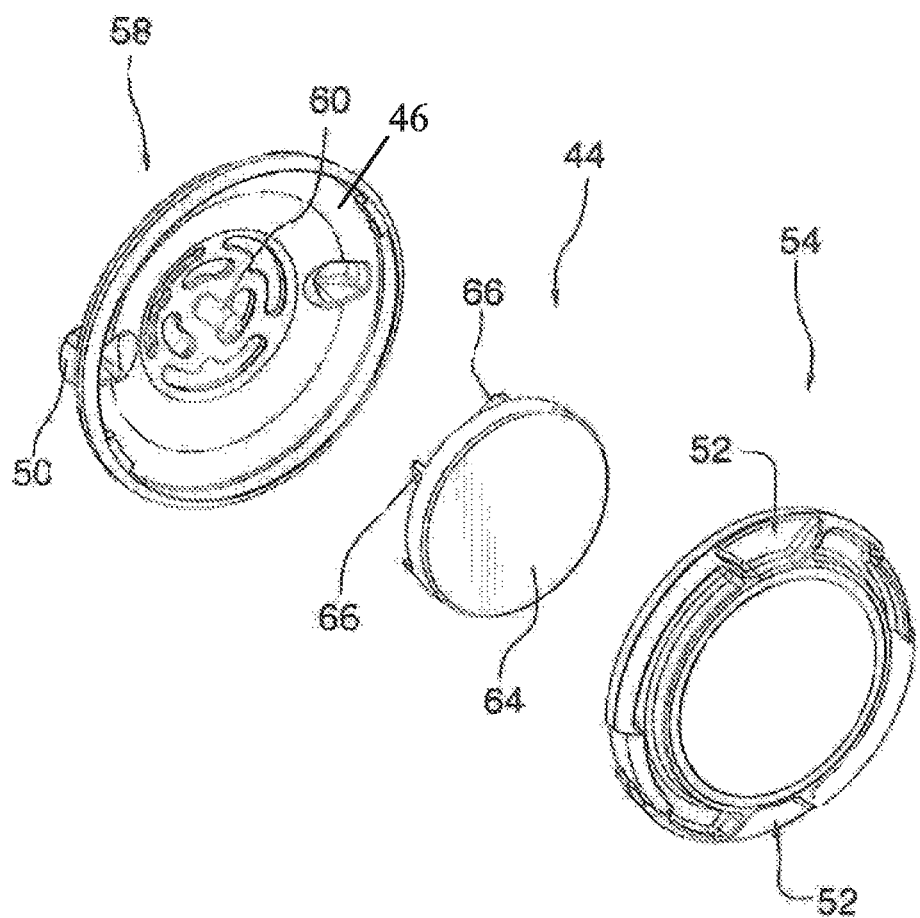
FIG. 3B is a reverse view of the structure of FIG. 3A.
Figure 4:
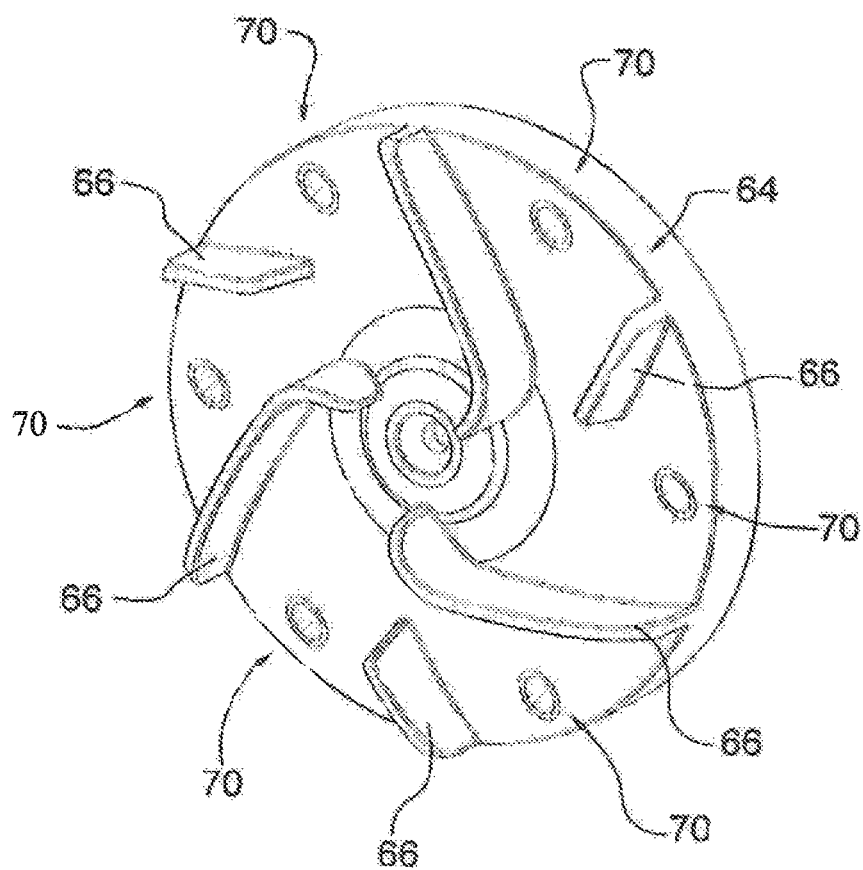
FIG. 4 is an enlarged view of the structure of encircled area 4 of FIG. 3A.
Figure 5:
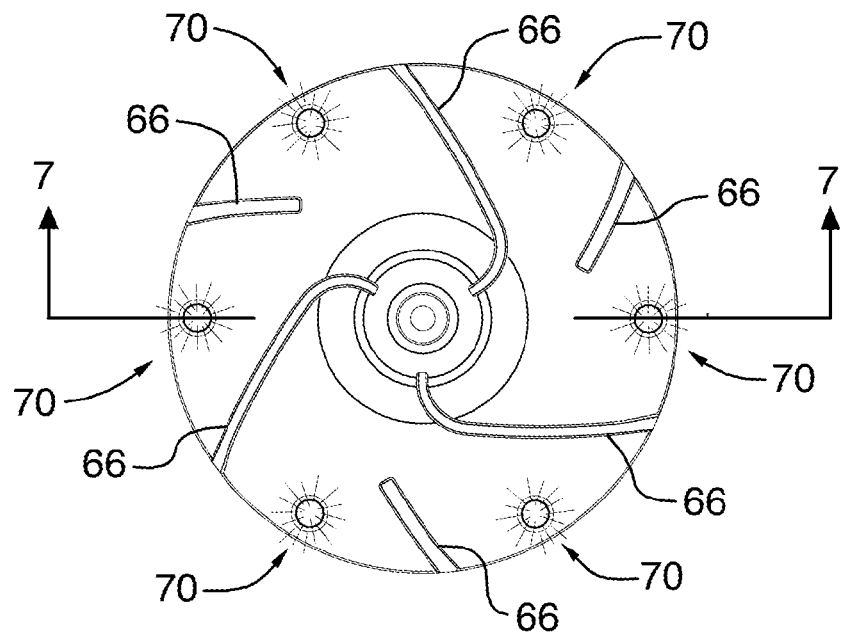
FIG. 5 is a plan view of the structure of FIG. 4.
Figure 6:
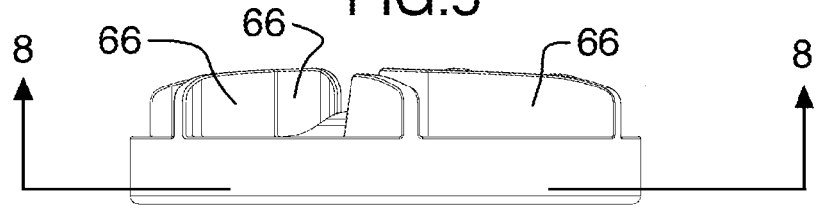
FIG. 6 is an edge view of the structure of FIG. 5.
Figure 8:
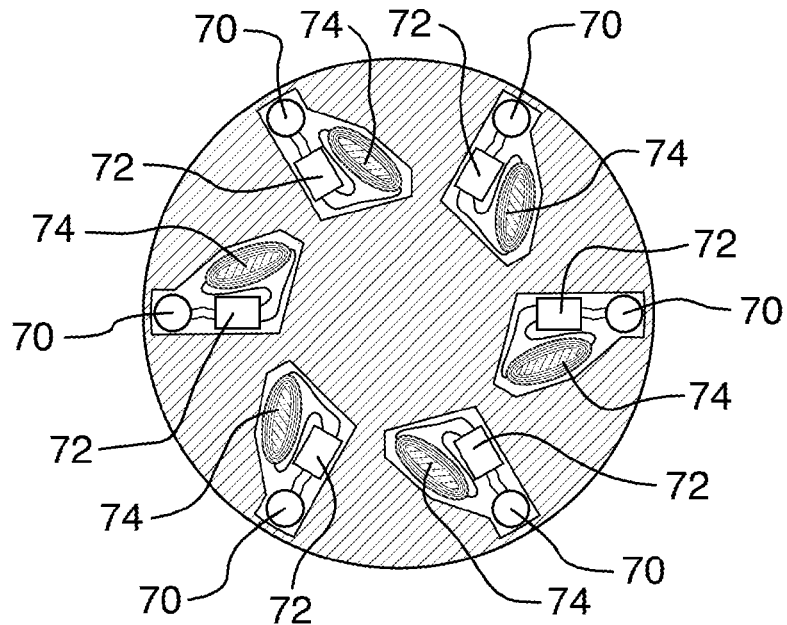
FIG. 8 is a view along section 8-8 of FIG. 6.
Figure 7:
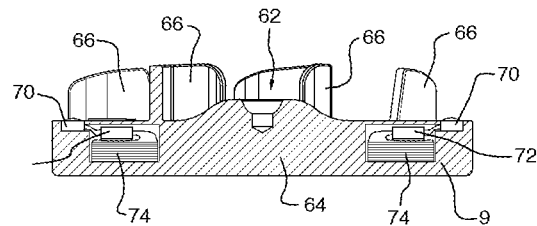
FIG. 7 is a view along section 7-7 of FIG. 5.
Figure 9:
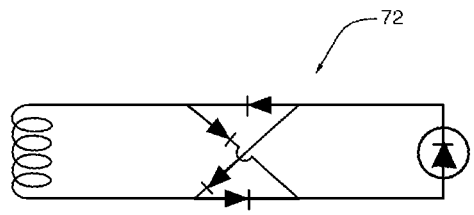
FIG. 9 is a schematic view of the structure of encircled area 9 of FIG. 7.

The drive hub 28
 is mounted to the shaft 36 for rotation therewith
 has two North pole domains 38 and two South pole domains 40, each defined by a respective permanent magnet, equally spaced apart from each other and arranged to encircle the rotation axis in alternating relation Turning now to FIGS. 3A, 3B and 11, the pump 30 will be seen to include a housing 42 and an impeller 44.

The housing 42:
 has an interior cavity 46
 has an inlet 48 communicating with the cavity 46
 has a pair of outlets 50 communicating with the cavity 46
 has a pair of detents 52
 is defined by:
  a backer plate 54 which carries the detents and a ferromagnetic ring 56 and
  a cover 58 which
   1. defines the inlet 48 and outlets 50
   2. is disposed in snap-fit relation with the backer plate 54 and
   3. has a spindle 60

The impeller 44
  is disposed interiorly of the cavity 46
  has a hollow 62 which is engaged by the spindle 60 and is thereby constrained against movement but for rotational movement
  includes
    a rotor body 64 of a non-magnetic, electrically-conductive material having relatively low magnetic permeability, specifically, aluminum
    a plurality of blades 66.

The impeller 44 differs significantly from other known impellers by the inclusion therein of a plurality, more particularly, six light assemblies 68, each including an ultraviolet light 70, a rectifier circuit 72 and a coil 74.

In use:
  the basin 22 is filled with water;
  the mount 24 is disposed in sealed relation to the side aperture 32, the seal being provided by an O-ring, as shown in FIG. 11;
  the motor 26 is mounted, exteriorly of the basin 22 and via bolts 84, to the mount 24 such that the rotation axis X-X is orientated towards the interior of the basin 22;
  the housing 42 is
    disposed interiorly of the basin 22
    urged against the basin 22 by magnetic attraction between the drive hub 28 and the ferromagnetic ring 56
    held against rotation via engagement of the detents 52 by the recesses 34
  the impeller 44 is disposed in the basin 22 in axially spaced relation to the drive hub 28
  the rotating magnetic fields associated with the drive hub 28 create induced currents in the coils 74 which actuate the lights 70 and create a net force that rotates the impeller 44, thereby causing
    water to be drawn through the inlet 48 and ejected through the outlets 50;
    the UV lights 70 to sterilize the water Whereas a specific embodiment is herein shown and described, variations are of course possible.

For example, whereas the illustrated drive hub has a pair of North pole domains and a pair of South Pole domains, greater and lesser numbers of domains are possible.

Similarly, whereas the illustrated impeller has six lights assemblies, greater and lesser numbers are possible.

Further, whereas UV lights are mentioned, other types of lights can be utilized.

Accordingly, the invention should be understood to be limited only by the accompanying claims, purposively construed.

The invention claimed is:

1. A spa comprising:
  a basin for containing water;
  a motor mounted exteriorly of the basin and having a rotating shaft, the shaft defining a rotation axis orientated towards the interior of the basin;
  a drive hub mounted to the shaft for rotation therewith, the hub having two or more North pole domains and two or more South pole domains, the North and South pole domains being spaced apart from each other and arranged to encircle the rotation axis in alternating relation; and
  an impeller which is disposed in the basin in axially spaced relation to the drive hub and is at least substantially constrained against movement but for rotation about the rotation axis, the impeller including a rotor body of a non-magnetic, electrically-conductive material having relatively low magnetic permeability,
  wherein the improvement comprises:
  one or more lights coupled to the impeller for rotation therewith; and
  one or more coils coupled to the impeller for rotation therewith and coupled to the lights,
  the lights and coils being adapted such that, in use, the rotating magnetic fields associated with the drive hub created induced currents in the coils which actuate the lights and create a net force that rotates the impeller.

2. The spa according to claim 1, wherein each of the North pole domains is defined by a respective permanent magnet and each of the South pole domains is defined by a respective permanent magnet.

3. The spa according to claim 2, wherein the number of North pole domains equals the number of South pole domains.

4. The spa according to claim 3, wherein, in use, the permanent magnets are equally spaced about the rotation axis.

5. The spa according to claim 4, wherein the rotor body is a made of a paramagnetic material.

6. The spa according to claim 4, wherein the rotor body is made of an aluminum alloy.

7. The spa according to claim 4, wherein the permanent magnets are disc-shaped.

* * * * *